United States Patent [19]
Tanaka

[11] Patent Number: 4,666,277
[45] Date of Patent: May 19, 1987

[54] DIAPHRAGM CONTROL ATTACHMENT

[75] Inventor: Osamu Tanaka, Hashimoto, Japan

[73] Assignee: Minolta Camera Kabushiki Kaisha, Osaka, Japan

[21] Appl. No.: 788,886

[22] Filed: Oct. 18, 1985

[30] Foreign Application Priority Data

Oct. 19, 1984 [JP] Japan .............................. 59-158719[U]

[51] Int. Cl.⁴ ............................. G03B 3/00; G02B 9/00
[52] U.S. Cl. ...................................... 354/270; 350/449
[58] Field of Search .................. 350/449; 354/270, 273

[56] References Cited

U.S. PATENT DOCUMENTS

| 2,164,526 | 7/1939 | Kimmich | 350/449 |
| 2,925,765 | 2/1960 | Gebele | 350/449 |
| 3,722,390 | 3/1973 | Schlapp et al. | 354/270 |

FOREIGN PATENT DOCUMENTS

1058830 6/1959 Fed. Rep. of Germany ...... 354/270

Primary Examiner—Donald A. Griffin
Attorney, Agent, or Firm—Watson, Cole, Grindle & Watson

[57] ABSTRACT

A diaphragm control attachment for use with an interchangeable optical device detachably attached to a main optical device.

7 Claims, 6 Drawing Figures

DIAPHRAGM CONTROL ATTACHMENT

FIELD OF THE INVENTION

The present invention relates to a diaphragm control attachment for use with an interchangeable optical device such as an interchangeable lens having no manual aperture setting member and which is capable of setting the aperture when it is loaded to the interchangeable optical device and when the aperture setting from the side of a main optical device, e.g., a camera body, is impossible.

BACKGROUND OF THE INVENTION

In a system which provides for a setting of the aperture of an interchangeable lens from the side of a camera body mechanism, it is not necessary to provide a manual aperture setting member on the lens barrel. But a lens barrel with an aperture setting member is still needed when the aperture setting from the side of the camera body is disabled, such as during reverse photographing. The aperture apparatus which achieves the aperture setting even in case the interlocking between the aperture mechanism in the side of the lens and the aperture setting mechanism in the side of the camera body is broken by use of a bellows and a close-up ring is also reported by the Japanese patent laid open No. 56-75725 and the Published Japanese utility model No. 52-38201. However, the aperture diaphragm is set by the setting Fthe side of the camera body is carried out, such an aperture setting member is unnecessary for a greater number of the users who do not want to make use of reverse photographing or do not use bellow, and for such users the use of an interchangeable lens which includes an aperture setting member entails increase of increased cost, size and weight of the interchangeable lens. But if the aperture setting member is eliminated for this reason, wide application of the interchangeable lens is lost. However it is disadvantageous to the manufacturer to have to make both interchangeable lenses which have aperture setting members thereon and lenses which do not.

SUMMARY OF THE INVENTION

Figure 6:
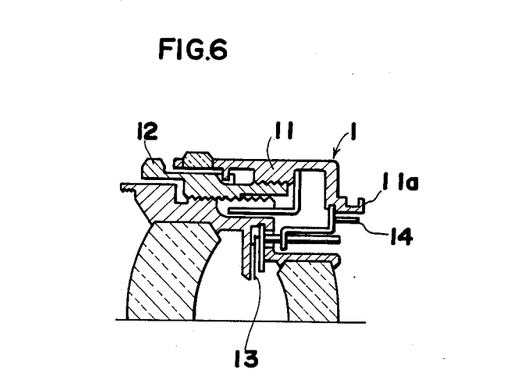
FIG. 6 is a half sectional view indicating an aperture setting adjustment from the engaging condition can be realized, although the aperture setting condition is stabilized due to engagement of engaging means.

In order to solve the problems mentioned above, the adapter of the present invention has at least a mount for loading or unloading to an interchangeable optical device for the simplified interchangeable optical device 1 having no aperture setting member as shown in FIG. 6, which further comprises an aperture setting means for operating an interlocking member which changes the diameter of the aperture when coupled to the interchangeable optical device, an aperture setting range restricting means which restricts the operation range of the aperture setting means to the predetermined adjusting range of the coupled interchangeable optical device, and an engaging means which adjustably engages the aperture setting means with each aperture setting position.

According to the present invention, the aperture apparatus can be loaded as required to the simplified interchangeable optical device which does not have an aperture setting member and the aperture setting can be achieved even when the aperture setting operation from the side of camera body is impossible.

Therefore, by providing a simplified device having no aperture setting member as an interchangeable optical device to be connected with an optical device body such as a camera body having an aperture setting function, the present invention is capable of giving users such advantages as reduction in size, weight, cost of interchangeable optical device or provision of other functions in place of the aperture setting member. Moveover, the present invention is capable of reasonably eliminating the disadvantage of having no aperture setting member by means of a simplified adapter or accessory, without providing other interchangeable optical device having aperture setting member, for the users who use the device under conditions where the aperture setting operation from the camera body is impossible, for example, when the reverse photographing is carried out or an intermediate ring is used.

An aperture setting value of the interchangeable optional device by the aperture setting means can be displayed in combination with an apparatus body to which a mount member is fixed and an aperture setting means which moves for the apparatus body while setting of the aperture, and such display may be realized with a number of steps of aperture from the open aperture in place of an F value.

The aperture setting means is enough, when it is most simplified, if it realizes such external operation as it collides with the aperture interlocking member of the interchangeable lens and moves such aperture interlocking member to the desired aperture value position.

A variable aperture setting range between the open aperture value and maximum aperture value is capable of following the difference in the open aperture value and the maximum aperture value of the interchangeable lens.

Change of such range can be realized by positionally adjusting the aperture setting means operation range restricting part in the side of the apparatus body in the direction of setting operation of aperture setting means or by positionally adjusting the restricting part in the direction of aperture setting on the aperture setting meahs of the part to be restricted which collides with the restricting part in the side of apparatus body of the aperture setting means side.

If required, the aperture setting means is combined with the aperture setting member which is externally operable for operating the aperture interlocking member of interchangeable optical device, an externally operable open aperture setting part which is coupled to the aperture setting member for position adjustment in the direction of aperture setting operation and displays an open aperture value of the interchangeable optical device with the apparatus body in accordance with such coupling position and an externally operable coupling member which is removably coupled to the aperture setting member and open aperture setting member and this means is co-employed with the system where display of the aperture setting value is made by a number of the steps of aperture. In this case, it is advantageous to use in common a coupling member for external operating part of aperture setting member.

Where the open aperture setting member is used in common as the part to be restricted for aperture which collides with the aperture setting range restricting part of the aperture setting member in the side of the aperture setting at the apparatus body, even when the open aperture of the interchangeable optical device is newly set, display of the aperture setting value corresponding to an interchangeable lens having preset open aperture value may be realized in common by display of the open aperture value. In this case, a part of the aperture setting member is used as the part to be restricted in he side of the open aperture which collides with the aperture setting range restricting part in the side of open aperture of the apparatus body. The aperture setting means also provides an aperture open engaging member which separates the aperture setting member to an externally operable aperture setting side member and an aperture operation side member which operates to aperture interlocking member of interchangeable optical device and forces the aperture operation side member to be separated to the open aperture side from the aperture setting side member, and the release can be realized with the cable release method by moving said aperture operation side member until it collides with the aperture setting side member being set to the desired setting position when the forced separation of aperture operation side member to the side of said open aperture is reset by the external depression of aperture open enagging member.

The apparatus body is also provided with a loading or unloading mount as required for the side of camera body and can also be used as an intermediate accessory.

The loading or unloading mount realizes loading to an interchangeable optical device having no aperture setting member and also realizes operation for the aperture interlocking member in the side of interchangeable optical device by the aperture setting means. The aperture setting means operates the aperture interlocking member of interhcangeable optical device having no aperture setting means independent of the function in the side of camera body and sets the aperture of interchangeable optical device to the desired aperture condition. Aperture adjustment by the aperture setting means is restricted by the aperture adjusting range restricting means. Thereby, the setting operation exceeding the aperture adjusting range of interchangeable optical device is rejected and the example of interchangeable lens having no aperture setting member.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Embodiment 1

FIG. 1 to FIG. 4 show an example of an aperture setting apparatus 2 wherein the interchangeable lens 1 having no aperture setting member is reversely mounted thereon for taking a close-up photography.

With this situation, the aperture setting by the function of the camera body (not illustrated) is disabled.

Although not illustrated, for example, an extention ring is attached to the left side of figure (front end of interchangeable lens) and the left end of the extention ring is loaded to a camera body.

As shown in FIG. 6, the interchangeable lens 1 has only a focusing ring 12 at the front side of a stationary barrel 11 as the externally operable member. An aperture interlocking member 14 which changes a diameter of aperture of aperture mechanism 13 is located at the rear side of the interchangeable lens 1 with a predetermined positional relation with the loading mount 11a of the stational barrel 11 in order to receive the aperture setting operation from the camera body. The aperture interlocking member 14 provides the equal interval of shifting stroke for the step-by-step change of setting aperture value.

The structure of this embodiment is explained with reference to FIG. 1 and FIG. 2.

The aperture setting apparatus 2 is provided with a loading mount 21a at the one end of annular apparatus body 21. The mount 21a is engaged or disengaged with/from a loading mount 11a provided to the stational barrel 11 of the interchangeable lens 1 in view of loading/unloading the apparatus body 21 of the aperture setting apparatus to the interchangeable lens 1. At the mount surface of the mount 21a, a lock pin 22 having an operating part 22a at the external circumference of the body 21 is provided and energized in the protruding direction and is engaged with a hole 11b formed to the mount surface of mount 1a when the mount 21a is engaged correctly with the mount 11a, locking the apparatus body 21 to the interchangeable lens 1 under the loading condition.

In the opposite side of the mount 21a of the body 21, aperture setting means 23 which operates the aperture interlocking member 14 of the interchangeable lens 1 loading the apparatus body 21 is provided. The aperture setting means 23 is a combination of an annular aperture setting member 231 which is rotatably held by a pocket 21b at the internal circumference of the body 21 and directly operates the aperture interlocking member 14 and a simi-circular open aperture setting member 232 which is held movably in reciprocal in the circumferencial direction of a semi-circular pocket 21c at the external circumference of the body 21 and is position-adjustably coupled indirectly to the aperture setting member 231 in the circumferencial direction.

The aperture setting member 231 has an ear segment 231a extended to the sector shaped extending part 21b' at the external circumference of the pocket 21b and this ear segment 231a allows loading of a coupling member 233 with the open aperture setting member 232. The coupling member 233 held movably in the radius direction with an elongaged hole 233a being engaged with a pair of pins 231b arranged in the radius direction on the ear segment 231a and thereby the operating part 233b is protruded to the outside from an elongated hole 21d in the circumferencial direction of the body 21. The part 233b is used for both an operation of setting the member 231 and an operation of resetting the coupling between the aperture setting and open aperture setting member 232. The coupling member 233 is energized in the protruding direction to the outside of the body 21 by a spring 234 working between the coupling member 233 and the aperture setting member 231. Thereby, an engaging pin 233c on the coupling member 233 is engaged, in the radius direction, with an opposing one of the open aperture setting engaging recessed portions 232a arranged at the one end of the open aperture setting member 232 and the aperture setting member 231 and the open aperture setting member 232 are integrally moved in the circumferencial direction through the coupling member 233.

The aperture setting member 231 is adjustably click stopped in each aperture setting position through engagement between engaging recessed portions 231c arranged, in the circumferencial direction, to the one surface of ear segment 231a and a ball 235 held by the body 21 with energization by a spring 236 applied thereon. At the external circumference of the apparatus body 21, aperture step graduation 237 which indicates the aperture setting values by the aperture setting member 231 in combination with the aperture setting index 236 on the coupling member 233 is arranged in the circumferencial direction.

At the external circumferencial surface of the open aperture setting member 232, open aperture value graduation 238 which indicates open aperture setting value in accordance with the coupling position of the member 232 for the aperture setting member 231 is arranged in the circumferencial direction and the open aperture setting value is externally indicated from a window 21e of the body 21. The operating part 232b of the open aperture setting member 232 is protruded from a semicircular window 21f of the end surface of the body 21.

The operable range of the aperture setting means 23 is defined by restriction in operation in the side of open aperture by the collision between the aperture setting range restricting part in the side of open aperture of the one end wall of the pocket extending part 21b' of the body 21 and a part 25 to be restricted in the side of open aperture for said restricting part 24 of the one side end of ear segment 231a of the aperture setting member 231 and restriction in operation in the side of aperture setting defined by the collision between the aperture setting range restricting part 26 in the side of aperture setting of the one end wall of the pocket 21c of the body 21 and a part 27 to be restricted in the side of aperture setting for restricting part 26 of the one end of the open aperture setting member 232.

At the internal circumferencial wall of the pocket 21c, an escaping recessed part 28 opposing to an engaging pin 233c when the coupling member 233 is located at the open aperture setting position is formed. Only when the coupling member 233 is located at the open aperture setting position, the pin 233c escapes from the recessed part 232a provided to the open aperture setting member 232 to the recessed part 28, releasing the coupling of the open aperture setting member 232 for the aperture setting member 231. Threby the coupling position can be changed, namely a setting open aperture value can be changed corresponding to the interchangeable lens 1 having different open aperture value.

An open aperture value setting index 239 for the open aperture value graduation 238 is indicated near a window 21e at the circumference of the body 21.

Figure 3:
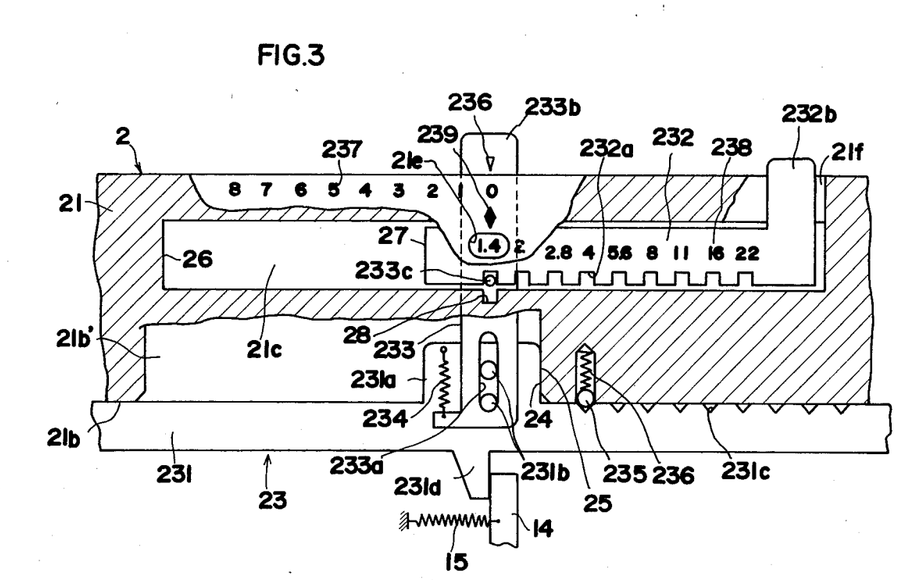
FIG. 3 and FIG. 4 are developed schematic view for explaining operations.
Figure 4:
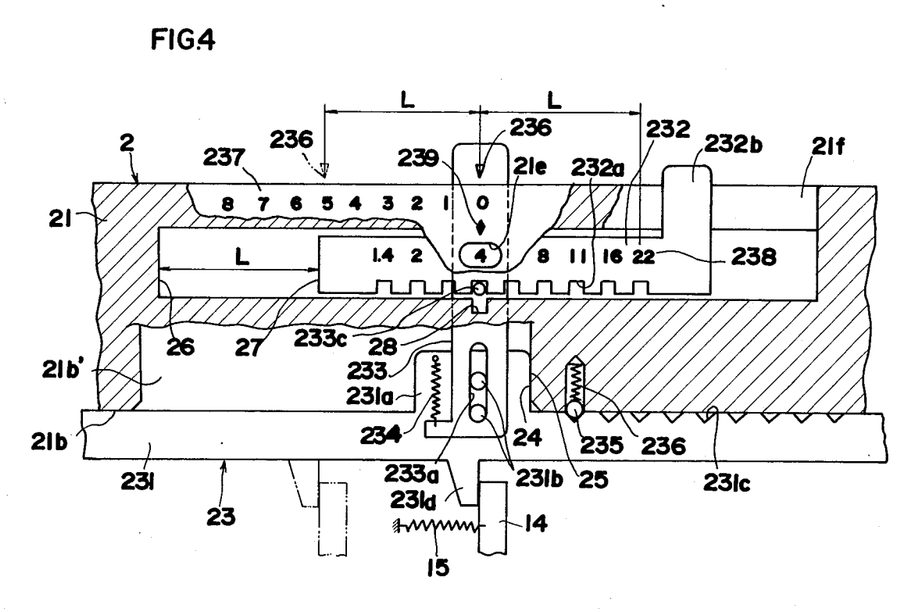

Meanwhile, as shown in FIG. 3 and FIG. 4, an aperture interlocking member 14 of the interchangeable lens 1 is energized by the spring 15 in such a direction for stop-down the aperture mechanism 13, the aperture setting member 231 is provided with an operating segment 231d which moves the aperture interlocking member 14 in the side of open aperture against the spring 15 when the body 21 is loaded to the interchangeable lens, and after the body 21 is loaded to the interchangeable lens 1, the aperture interlocking member 14 is engaged with the position corresponding to the aperture setting position following the aperture setting member 231, setting the aperture mechanism 13 to the preset aperture value condition.

Figure 1:
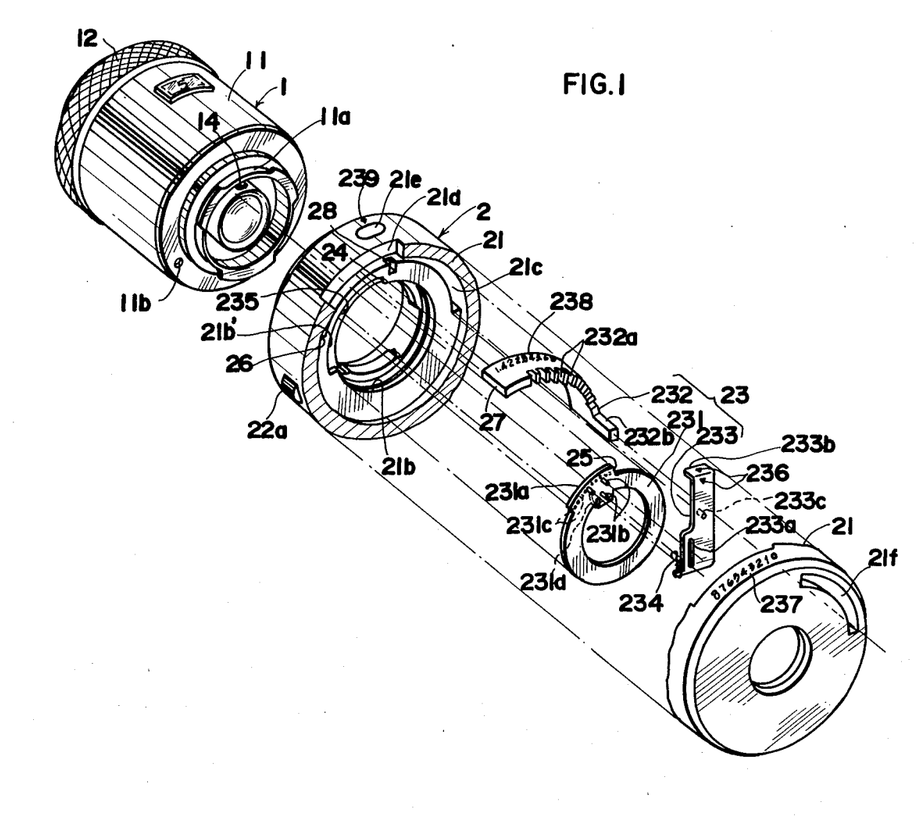
FIG. 1 is a disassembled perspective view of the first embodiment of the present invention.
Figure 2:
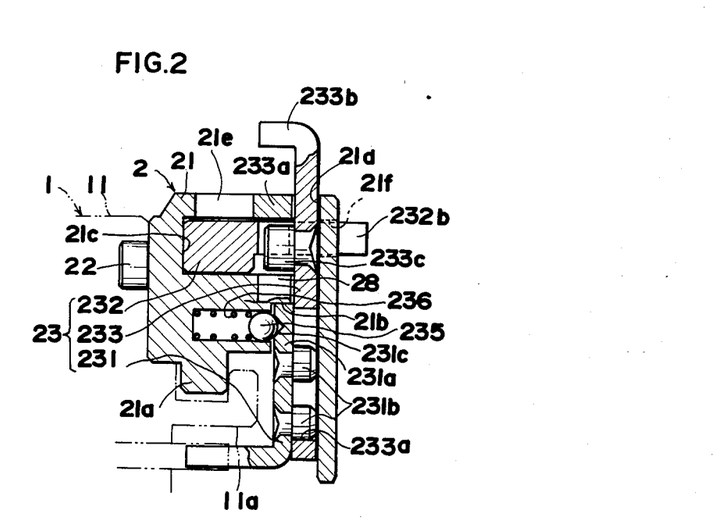
FIG. 2 is a part of enlarged sectional view.

FIG. 3 and FIG. 4 show the developed schematic views of operations of the embodiment shown in FIG. 1 and FIG. 2 wherein the aperture values are changed from 1.4 to 22, or a number of aperture steps is changed from 0 to 8. In these figures, the operating directions of respective members are indicated on the plane for easy understanding of operations. Therefore, the shape of each member is also different from that in FIG. 1 and FIG. 2. The operations are explained hereunder with reference to these figures.

FIG. 3 shows the condition of setting to the open aperture of 1.4, wherein the engaging pin 233c of the coupling member 233 is engaged with the engaging recessed part 232a corresponding to the open aperture value graduation of 1.4 on the open aperture setting member 232 corresponding to the open aperture value of 1.4 of interchangeable lens 1. Moreover, the aperture is set to the open aperture condition where the aperture setting restriction part 24 in the side of open aperture and the part 25 to be restricted in the side of open aperture collide.

Thereby, when the body 21 is loaded to the interchangable lens 1, the aperture interlocking member 14 is held at the open aperture position by the aperture setting member 231. In this case, the aperture step 0 corresponds to the aperture setting index 236, indicating the open aperture setting condition and the setting open aperture value of 1.4 can be observed corresponding to the open aperture value setting index 239 through the window 21e.

When the aperture setting index 236 is sequentially shifted to the aperture step 0 to 8 by moving the operating part 233b to the left (counterclockwise in FIG. 1), the coupling member 233 integrally moves the aperture setting member 231 and the open aperture setting member 232 in the same direction. Thereby, the aperture interlocking member 14 following the aperture setting member 231 adjusts the aperture mechanism 13 from the aperture value 1.4 to 2, from 2 to 2.8, from 2.8 to 4, from 4 to 5.6 step by step up to the aperture value of 22 for each increase of aperture step one by one, setting the aperture according to the desired aperture step. In this case, change of aperture value in accordance with each aperture step is sequentially indicated in the window 21e by the open aperture setting graduation 238 on the open aperture setting member 232 becuase the intervals of graduation angles of aperture step graduation 237 and open aperture setting graduation 233 are equal.

When the aperture reaches the aperture step 8, the part 27 to be restricted in the side of aperture setting collides with the aperture setting range restricting part 26 in the side of aperture setting and further aperture setting operation is disabled. In the open aperture side, the part 25 to be restricted in the side of opan aperture collides, as shown in FIG. 3, with the open aperture setting range restricting part 24 and thereby the open aperture operation in aperture value of 1.4 or more is disabled.

Here, the interchangeable lens with open aperture value of 1.4 shown in FIG. 3 is changed to the lens with open aperture value of 4. In this case, the apparatus body 31 is unloaded from the interchangeable lens 1 with open aperture value of 1.4 and the operating part 233b located at the aperture step 0 is pressed toward the body 21 (lower side in FIG. 1, namely inside of radius direction) in the aperutre setting condition shown in FIG. 3. Thereby, the coupling member 233 is pressed to the body 21 against the spring 234 while escaping the engaging pin 233c to the escaping recessed portion 28 of the body 21 from the recessed part 232a of the open aperture setting member 232, decoupling the open aperture setting member 232 from the aperture setting member 231.

Under this decoupling condition, the operating part 232b is moved to the left side in FIG. 3 (counterclockwise in FIG. 1) and the open aperture setting member 232 is adjusted to the position indicated by a solid line in FIG. 4 so that the predetermined open aperture value of 4 is indicated with the window 21e corresponding to the index 238. When the operating part 233b is released after this position adjustment, the coupling member 233 returns to the initial condition wherein it is protruded from the apparatus body 21, owing to the energization by the spring 234, while removing the engaging pin 233c from the escaping recessed part 28 and engaging it with the engaging recessed part 232a corresponding to the graduation 4 of setting open aperture value on the open aperture setting member 232 and couples the open aperture setting member 232 to the aperture setting member 231 as shown in FIG. 4 in the new setting condition of open aperture value 4.

Under this condition, the condition where the aperture step is 0 defined when the part to be restricted in the side of open aperture collides with the aperture setting range restricting part 24 in the side of open aperture, namely an aperture value under the open aperture setting condition becomes 4 and the open aperture which is higher than said aperture value is disabled.

Thereby, when the body 21 under the condition of FIG. 4 is loaded to the interchangeable lens 1 with the open aperture value of 4, the aperture interlocking member 14 is held at the open aperture position by the aperture setting member 231 like the above case and the aperture setting operation can be realized as explained above.

However, the aperture setting range is set up to 22 from 4 of aperture value, or up to 5 from 0 of aperture step. This is indicated by the stroke range L in the figure.

Embodiment 2

Figure 5:
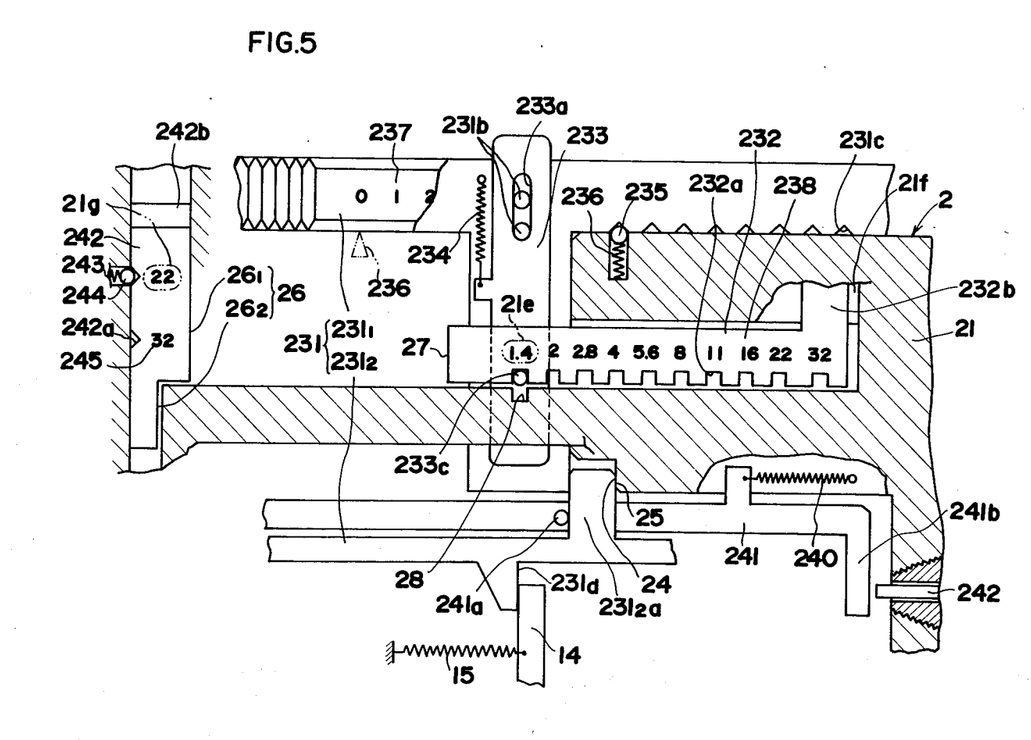
FIG. 5 is a developed schematic view of the second embodiment.

This embodiment always opens the aperture and allows aperture setting by a cable release only during the photographing and also realizes adjustment of minimum aperture. As shown in FIG. 5, the aperture setting member 231 forms an external operation ring and combines the aperture setting side member $231_1$ having the coupling member 233 coupling the member 231 with the open aperture setting member 232 and the aperture operation side member $231_2$ which operates the aperture interlocking member 14 in accordance with said aperture setting side member $231_1$. FIG. 5 is a schematic diagram similar to those shown in FIG. 3 and FIG. 4 and the actual shape is similar to that of FIG. 1. The aperture operation side member $231_2$ has a protruded segment $231_{2a}$ which collides with the open aperture side edge at the end extended from the aperture setting side member $231_1$ and operates for the coupling member 233 and the aperture setting side member $231_1$, depending on the biasing force of the spring 15 through the aperture interlocking member 14 for the operating segment 231d. Thereby, the aperture operation side member $231_2$ restricts the position of the aperture interlocking member 14 corresponding to an aperture value preset by the aperture setting side member $231_1$, setting the aperture mechanism 13 to the specified aperture condition. Here, the members $231_1$, $231_2$ have substantially the same function as the aperture setting member 231 of the embodiment 1. The one edge of the protruded segment $231_{2a}$ is used as the part 25 to be restricted in the open aperture side for the aperture setting range restricting part 24 in the open aperture side.

An aperture open engaging member 241 which holds the aperture operation side member $231_2$ to the open aperture position even when the aperture setting side member $231_1$ is operated up to the aperture setting position by energization of a spring 240.

It can be realized by giving a spring force which is larger than that of the spring 15 working for the aperture interlocking member 14 to the spring 240. The aperture open engaging member 241 provides a pin 241a for engaging the aperture operation side member $231_2$ and also provides a receptor 241b which is externally operated by a cable release wire 242.

Thereby, the aperture operation side member $231_2$ is held at the open aperture position even when the aperture setting side member $231_1$ is set at a stop-down aperture valve position. Thus, the aperture open engaging member 241 is pressed toward the left of FIG. 4 only when the cable release wire 242 is operated. At that time, the engagement to the open aperture position is released, and the protruded segment $231_{2a}$ is first moved to the left until it collides with the end extended from the aperture setting side member $231_1$ together with the aperture interlocking member 14 for setting the aperture mechanism 15 to the preset aperture condition.

Meanwhile, an aperture setting range restricting part 26 in the aperture setting side of the body 21 is formed on the aperture setting range restricting member 242 which is movable for the body 21 and is composed of the first restricting part $26_1$ which restricts the minimum aperture to 22 and the second restricting part $26_2$ which restricts the minimum aperture to 32. Therefore, the aperture setting range restricting position in the aperture setting side of the aperture setting means 23 is adjusted in accordance with the first or second restricting part to be opposed to the part 27 to be restricted in the aperture setting side, corresponding to the minimum aperture of the interchangeable lens 1 to be loaded.

For this adjustment, the restricting member 242 is provided for external operation. Each adjusting position of the restricting member 242 is click-stopped through engagement between the recessed part 242a of restricting member 242 and a ball 244 energized by a spring 243 in the side of the body 21. The minimum aperture setting graduation 245 is provided on the restricting member 242 and it can be observed from the outside through the window 21g of the body 21. 242b is the operation part of member 242.

The embodiments 1, 2 are indicated as the aperture setting adapter for reverse photographing. But this invention can be adapted to be used with an intermediate accessory such a as bellows having no aperture interlocking mechanism, the bellows being located between the interchangeable lens and the camera body.

With the above embodiments, the interchangeable lens has the aperture interlocking member energized in the aperture setting direction but the present invention can also be adapted to the lens having the aperture interlocking member being energized in the open aperture direction.

In the second embodiment which realizes aperture setting only in taking a picture, it is also possible to provide a preview operation member to the aperture setting means, push the open aperture engaging member with operation of the member and thereby realizing aperture setting without using the cable release.

Moreover, even in case there is a difference between the stroke of aperture setting operation in the adapter side and the stroke of the aperture adjusting operation of the aperture interlocking member of the interchangeable optical device, the similar object can be attained by employing the stroke exchange mechanism between the aperture setting means in the adapter side and the aperture interlocking member of the interchangeable optical device.

What is claimed is:

1. A diaphragm control attachment for use with an interchangeable lens detachably attached to a camera body by relative contact of respective mounting means, said interchangeable lens including an aperture diaphragm and an aperture control mechanism for controlling the aperture size of said diaphragm by an operation from said camera body, said attachment comprising:
   a body member;
   a connecting means disposed in said body member for connecting with said mounting means of said interchangeable lens so as to attach said attachment to said interchangeable lens;
   a contacting means for controlling the aperture size of said diaphragm by contacting with said aperture control mechanism when said attachment is attached to said interchangeable lens;
   a retainer means for releasably retaining said contacting means in predetermined positions;
   a manual operating means for moving said contacting means against the retaining of said retainer means so as to move said aperture control mechanism; and
   a restricting means for restricting the movement of said manual operating means and said contacting means, said restricting means is movably arranged for varying the movable range of said contacting means.

2. A diaphragm control attachment as set forth in claim 1, wherein said restricting means comprises a pair of first limit contacting portions for restricting movement of said contacting means from stop-down position to open position by a relative contact and a pair of second limit contacting portions for restricting movement of said contacting means from one position to stop-down position by a relative contact, and at least one of said pairs of first and second limit contacting portions is so arranged that the relative distance is variable for varying the movable range of said contacting means.

3. A diaphragm control attachment as set forth in claim 1, wherein said body member comprises an index and said contacting means comprises a second index for indicating the aperture value of said aperture diaphragm by a relative position of said indices.

4. A diaphragm control attachment for use with an interchangeable optical device detachably attached to a main optical device, said interchangeable optical device including an aperture diaphragm and an aperture control mechanism for controlling the aperture size of said diaphragm by an operation from said main optical device, said attachment comprising:
   a body member;
   a connecting means disposed in said body member for connecting said attachment with said interchangeable optical device detachably;
   a contacting means contacting with said mechanism so as to control the aperture size of said diaphragm;
   a retainer means for releasably retaining said contacting means in predetermined positions;
   a manual operating means for moving said contacting means so as to move said mechanism; and
   means for restricting a movable range of said contacting means, comprising a first limit contacting portion for restricting movement of said contacting means from stop-down position to open position and a second limit contacting portion for restricting movement of said contacting means from open position to stop-down position.

5. A diaphragm control attachment as set forth in claim 4, further comprising a changeover means for moving said restricting means so as to changeover said movable range of said contacting means.

6. A diaphragm control attachment as set forth in claim 5, wherein said changeover means comprises a first changeover member for moving said first limit contacting portion and a second changeover member for moving said second limit contacting portion.

7. A diaphragm control attachment for use with an interchangeable optical device detachably attached to a main optical device, said interchangeable optical device including an aperture diaphragm and an aperture control mechanism for controlling the aperture size of said diaphragm by an operation from said main optical device, said attachment comprising:
   a body member;
   a connecting means disposed in said body member for connecting said attachment with said interchangeable optical device detachably;
   a contacting means contacting with said mechanism so as to control the aperture size of said diaphragm;
   a retainer means for releasably retaining said contacting means in predetermined positions;
   a manual operating means for moving said contacting means so as to move said mechanism;
   means for restricting a movable range of said contacting means; and
   a first and a second indices provided on said body member and said contacting means respectively for indicating the aperture value of said aperture diaphragm by a relative position of said indices.

* * * * *